United States Patent
Cheng et al.

(10) Patent No.: US 11,382,003 B2
(45) Date of Patent: Jul. 5, 2022

(54) APPARATUSES AND METHODS FOR COORDINATING COMMUNICATION OPERATIONS ASSOCIATED WITH A PLURALITY OF SUBSCRIBER IDENTITIES

(71) Applicant: MEDIATEK INC., Hsin-Chu (TW)

(72) Inventors: Tsung-Huan Cheng, Hsinchu (TW); Hsi-Feng Chen, Hsinchu (TW); Kuan-Hung Tsai, Hsinchu (TW); Chih-Yuan Tsai, Hsinchu (TW); Tsan-Ya Peng, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/362,983

(22) Filed: Mar. 25, 2019

(65) Prior Publication Data

US 2019/0306760 A1     Oct. 3, 2019

Related U.S. Application Data

(60) Provisional application No. 62/648,445, filed on Mar. 27, 2018.

(51) Int. Cl.
*H04W 36/00*     (2009.01)
*H04L 65/1016*     (2022.01)
*H04W 88/02*     (2009.01)

(52) U.S. Cl.
CPC ..... *H04W 36/0022* (2013.01); *H04L 65/1016* (2013.01); *H04W 88/02* (2013.01)

(58) Field of Classification Search
CPC .............................................. H04W 36/0022
See application file for complete search history.

(56) References Cited

U.S. PATENT DOCUMENTS

| | | | |
|---|---|---|---|
| 8,270,970 | B1 | 9/2012 | Luo et al. |
| 9,264,914 | B2 | 2/2016 | Chen et al. |
| 10,028,305 | B2 | 7/2018 | Han |
| 10,750,411 | B2 | 8/2020 | Chinthalapudi et al. |
| 10,980,001 | B2 | 4/2021 | Huang et al. |
| 2012/0327790 | A1 | 12/2012 | Lee et al. |

(Continued)

FOREIGN PATENT DOCUMENTS

| | | |
|---|---|---|
| CN | 101217747 A | 7/2008 |
| CN | 101835177 A | 9/2010 |

(Continued)

OTHER PUBLICATIONS

Taiwan Office Action dated Sep. 8, 2020, issued in application No. 10920864040.

(Continued)

*Primary Examiner* — Jason E Mattis
(74) *Attorney, Agent, or Firm* — McClure, Qualey & Rodack, LLP

(57) ABSTRACT

A mobile communication device including a Radio Frequency (RF) device and a controller is provided. The controller is coupled to the RF device and configured to allocate the RF device to selectively communicate with a Packet Switched (PS)-based network using a first subscriber identity or with a service network using a second subscriber identity, and ignore a paging message associated with the first subscriber identity during an ongoing on-demand service associated with the second subscriber identity.

10 Claims, 7 Drawing Sheets

(56) References Cited

U.S. PATENT DOCUMENTS

| | | | |
|---|---|---|---|
| 2013/0150095 A1* | 6/2013 | Mehio | H04W 68/005 |
| | | | 455/458 |
| 2016/0095023 A1 | 3/2016 | Payyappilly et al. | |
| 2016/0112084 A1* | 4/2016 | Parron | H04L 47/245 |
| | | | 455/558 |
| 2016/0126996 A1 | 5/2016 | Jeong et al. | |
| 2016/0128071 A1* | 5/2016 | Ngai | H04B 1/71055 |
| | | | 370/329 |
| 2016/0142998 A1 | 5/2016 | Tsai et al. | |
| 2016/0249320 A1 | 8/2016 | Sanka et al. | |
| 2017/0134994 A1* | 5/2017 | Chinthalapudi | H04L 65/1069 |
| 2017/0265114 A1* | 9/2017 | Sahu | H04W 48/18 |
| 2017/0353974 A1 | 12/2017 | Rupanagudi et al. | |
| 2017/0359800 A1* | 12/2017 | Cui | H04W 88/06 |
| 2018/0368099 A1* | 12/2018 | Chen | H04W 48/18 |
| 2019/0098487 A1* | 3/2019 | Boettger | H04W 28/065 |
| 2019/0349153 A1* | 11/2019 | Li | H04L 5/0005 |
| 2020/0336979 A1* | 10/2020 | Aoyagi | H04W 48/16 |

FOREIGN PATENT DOCUMENTS

| | | |
|---|---|---|
| CN | 102083110 A | 6/2011 |
| CN | 102843782 A | 12/2012 |
| CN | 103096482 A | 5/2013 |
| CN | 104780590 A | 7/2015 |
| CN | 105611631 A | 5/2016 |
| CN | 106535331 A | 3/2017 |
| CN | 106686565 A | 5/2017 |
| CN | 107690134 A | 2/2018 |
| CN | 107872841 A | 4/2018 |
| CN | 109246815 A | 1/2019 |
| CN | 109314736 A | 2/2019 |
| CN | 109379783 A | 2/2019 |
| WO | 2013/170140 A1 | 11/2013 |
| WO | 2015/180128 A1 | 12/2015 |

OTHER PUBLICATIONS

Chinese language office action dated Dec. 24, 2021, issued in application No. CN 201911052606.9.

Long, W., et al.; "Research of LAC Paging Capacity and Design in GSM Network;" May 2006; pp. 18-23.

English language abstract of "Research of LAC Paging Capacity and Design in GSM Network;" p. 1 of attachment.

Yan, Y.-F.; "Application of TMSI Paging and Selected Authentication;" Communications Technology; vol. 46; No. 7; Jul. 2013; pp. 76-78.

English language abstract of "Application of TMSI Paging and Selected Authentication;" p. 1 of attachment.

Vivo, China Telecom; "New Rel-17 SID proposal: Study on multi-SIM devices in RAN;" 3GPP TSG RAN Meeting #83, RP-190282; Mar. 2019; pp. 1-4.

Intel, Qualcomm Inc., Lenovo, Motorola Mobility; "Enhancements to Dual Registration mode of operation;" SA WG2 Meeting #128, S2-186370; Jun. 2018; pp. 1-3.

* cited by examiner

APPARATUSES AND METHODS FOR COORDINATING COMMUNICATION OPERATIONS ASSOCIATED WITH A PLURALITY OF SUBSCRIBER IDENTITIES

CROSS REFERENCE TO RELATED APPLICATIONS

This application claims priority of U.S. Provisional Application No. 62/648,445, filed on Mar. 27, 2018, the entirety of which is incorporated by reference herein.

BACKGROUND OF THE APPLICATION

Field of the Application

The application generally relates to wireless communications, and more particularly, to apparatuses and methods for coordinating communication operations associated with a plurality of subscriber identities.

Description of the Related Art

With growing demand for ubiquitous computing and networking, various wireless technologies have been developed, such as the Global System for Mobile communications (GSM) technology, General Packet Radio Service (GPRS) technology, Enhanced Data rates for Global Evolution (EDGE) technology, Universal Mobile Telecommunications System (UMTS) technology, Interim Standard 95 (IS-95) technology, Code Division Multiple Access 2000 (CDMA-2000) technology, CDMA-2000 1× Evolution-Data Optimized or Evolution-Data (CDMA-2000 1×EV-DO) technology, Time Division-Synchronous Code Division Multiple Access (TD-SCDMA) technology, Worldwide Interoperability for Microwave Access (WiMAX) technology, Long Term Evolution (LTE) technology, Long Term Evolution-Advanced (LTE-A) technology, Time-Division LTE (TD-LTE) technology, 5G New Radio (NR) technology, and others.

Generally, a cellular phone only supports one wireless technology that provides users with flexible mobile communications at all times via the supported wireless technology using a single subscriber identity card (which provides a single subscriber identity). However, to an increasing extent, more and more people find having an additional subscriber identity card (which provides an additional subscriber identity) to be a good way to reduce their mobile service charges (including voice and/or data services), or to separate personal and business phone calls. In order to alleviate the burden of carrying two cellular phones for two separate subscriber identity cards, so-called dual-card cellular phones have been developed, which generally support two wireless technologies using a single Radio Frequency (RF) device for respective mobile services using an individual subscriber identity card. The dual-card design allows both wireless technologies to be active simultaneously and allows calls to be made or received (on either subscriber identity) amid other mobile services. That is, when the RF device is allocated to the communication operations associated with one subscriber identity card, the paging message for the other subscriber identity card cannot be missed due to the paging message may be for call services. As a result, the ongoing service associated with one subscriber identity card will be interrupted by the paging operation of the other subscriber identity card.

Nevertheless, there are situations where the paging message may be for a non-call service, such as Internet service. In such circumstances, if the paging message is a Packet-Switched (PS) paging message in compliance with the LTE-based technology, communication operations responding to the received paging message would be necessary to determine whether the paging message is for a call service or a non-call service, and the responding communication operations, including connection establishment, and data transfer, may take a long time, causing transmission timeout of the interrupted service.

BRIEF SUMMARY OF THE APPLICATION

In order to solve the aforementioned problems, the present application proposes to reduce the interruption time of the ongoing high-priority service associated with one subscriber identity, by ignoring or avoiding receiving low-priority paging messages associated with another subscriber identity.

In a first aspect of the application, a mobile communication device comprising a RF device and a controller coupled to the RF device is provided. The controller is configured to allocate the RF device to selectively communicate with a PS-based network using a first subscriber identity or with a service network using a second subscriber identity, and ignore a paging message associated with the first subscriber identity during an ongoing on-demand service associated with the second subscriber identity.

In a second aspect of the application, a method for coordinating communication operations associated with a plurality of subscriber identities in a mobile communication device comprising an RF device is provided. The method comprises the steps of: allocating the RF device to selectively communicate with a PS-based network using a first subscriber identity or with a service network using a second subscriber identity; and ignoring a paging message associated with the first subscriber identity during an ongoing on-demand service associated with the second subscriber identity.

In a third aspect of the application, a mobile communication device comprising an RF device and a controller coupled to the RF device is provided. The controller is configured to allocate the RF device to selectively communicate with a PS-based network using a first subscriber identity or with a service network using a second subscriber identity, and in response to an IP Multimedia Subsystem (IMS) service being available with the first subscriber identity in the PS-based network and starting an on-demand service associated with the second subscriber identity, deactivate all non-IMS services associated with the first subscriber identity or perform a PS detach procedure and a PS attach procedure with the PS-based network using the first subscriber identity.

In a fourth aspect of the application, a method for coordinating communication operations associated with a plurality of subscriber identities in a mobile communication device comprising an RF device is provided. The method comprises the steps of: allocating the RF device to selectively communicate with a PS-based network using a first subscriber identity or with a service network using a second subscriber identity; and in response to an IMS service being available with the first subscriber identity in the PS-based network and in response to starting an on-demand service associated with the second subscriber identity, deactivating all non-IMS services associated with the first subscriber identity or performing a PS detach procedure and a PS attach procedure with the PS-based network using the first subscriber identity.

Other aspects and features of the present application will become apparent to those with ordinarily skill in the art upon review of the following descriptions of specific embodiments of the mobile communication devices and the methods for coordinating communication operations associated with a plurality of subscriber identities in a mobile communication device comprising an RF device.

BRIEF DESCRIPTION OF DRAWINGS

The invention can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
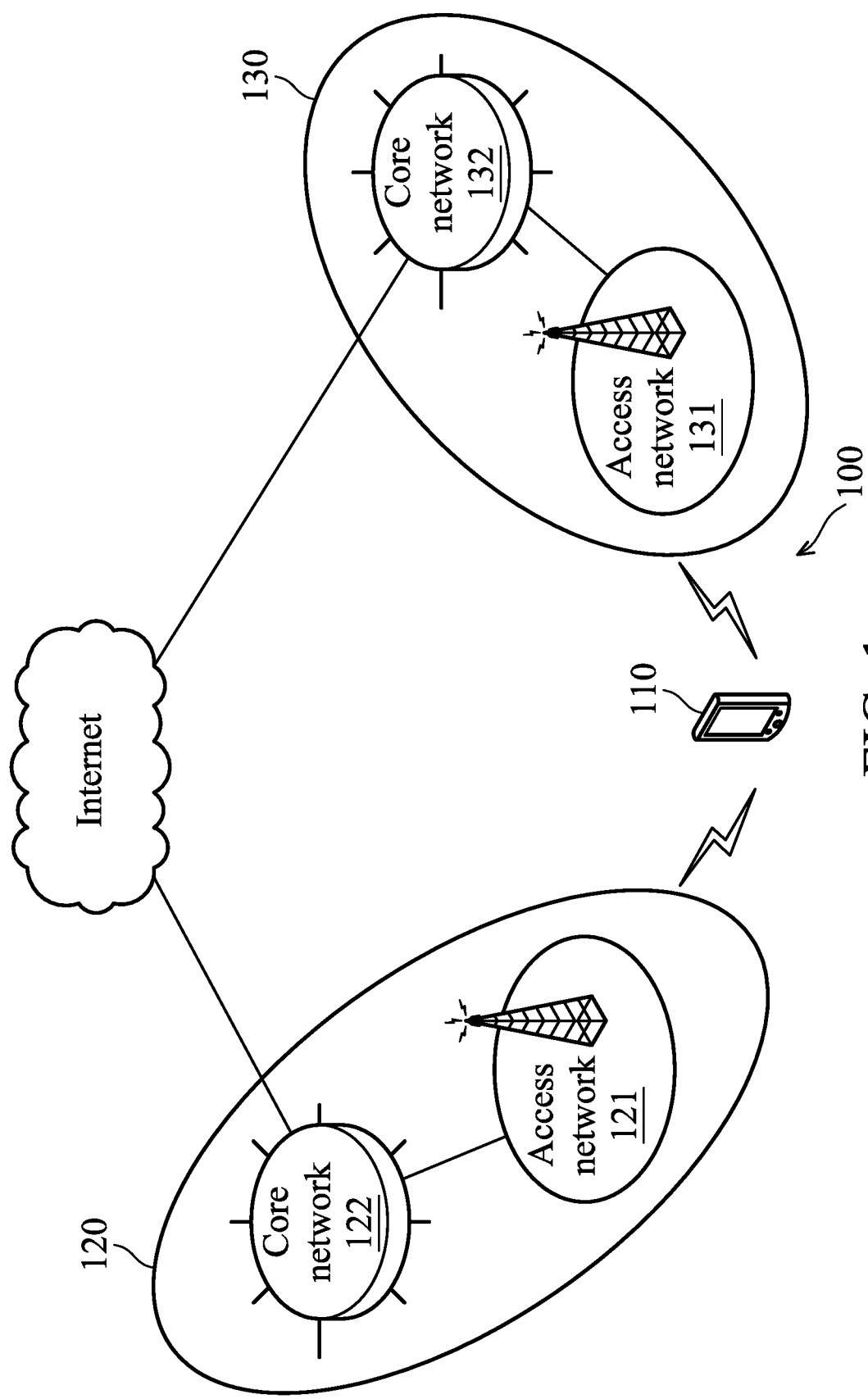
FIG. 1 is a block diagram of a wireless communication environment according to an embodiment of the application.

FIG. 1 is a block diagram of a wireless communication environment according to an embodiment of the application.

The wireless communication environment 100 includes a mobile communication device 110 and two service networks 120 and 130.

The mobile communication device 110 may be referred to as a User Equipment (UE) or Mobile Station (MS), such as a feature phone, a smartphone, a panel Personal Computer (PC), a laptop computer, or any computing device supporting the wireless technologies utilized by the service networks 120 and 130.

The service network 120 may be a Circuit-Switched (CS) legacy network, such as a GSM/GPRS/EDGE/IS-95 network (also called 2G network), or a WCDMA/CDMA-2000/TD-SCDMA network (also called 3G network), while the service network 130 is a Packet Switched (PS)-based network, such as an LTE-based (e.g., LTE/LTE-A/TD-LTE) network, a 5G NR network, or any future cellular network.

The mobile communication device 110 may wirelessly and selectively communicate with the service network 120 or 130 at a given time for obtaining mobile services, including CS and PS services, using two separate subscriber identities, due to that an RF device is shared by the communication operations associated with two subscriber identities. The CS services include CS call services, and Short Message Service (SMS), etc., and the PS services include PS call services (e.g., the Voice over IP (VoIP) service, and Voice-over-LTE (VoLTE) call service, etc.), on-demand services (e.g., the Multimedia Messaging Service (MIMS), and video streaming service, etc.), and Internet services (e.g., e-mail service, web page browsing, and file transmission, etc.).

In the present application, a priority level of each type of mobile services may be predetermined. For example, call services (e.g., the CS call service, and the PS call service) may have the highest priority, on-demand services (e.g., the MMS, and video streaming service, etc.) may have the second highest priority, and Internet services (e.g., e-mail service, web page browsing, and file transmission, etc.) may have the lowest priority. Please note that the on-demand services may be defined by the user of the mobile communication device 110, and are not limited to the MMS and the video streaming service.

The mobile communication device 110 may include two or more sockets, in each of which a respective subscriber identity card may be inserted to provide an individual subscriber identity (also called subscriber number). The subscriber identity cards may provide two separate subscriber identities in compliance with the specifications of the wireless technologies employed by the service networks 120 and 130, respectively. For example, one subscriber identity card may be a Subscriber Identity Module (SIM) card if the service network 120 is a GSM/GPRS/EDGE network; or one subscriber identity card may be a Universal SIM (USIM) card if the service network 120 or 130 is a WCDMA or LTE-based network; or one subscriber identity card may be a Removable User Identity Module (R-UIM) card if the service network 120 is a IS-95, CDMA-2000, or CDMA-2000 1×EV-DO network; or one subscriber identity card may be a CDMA subscriber Identity Module (CSIM) card if the service network 120 is a TD-SCDMA network.

Alternatively, the subscriber identities may be directly written into the mobile communication device 110, without the need for any socket to insert any subscriber identity card, or the subscriber identities may be provided by one or more virtual subscriber identity cards (e.g., eSIM/eUSIM), and the present application is not limited thereto.

The service network 120 includes an access network 121 and a core network 122, while the service network 130 includes an access network 131 and a core network 132. Each of the access networks 121 and 131 is responsible for processing radio signals, terminating radio protocols, and connecting the mobile communication device 110 with the core network 122 or 132, while each of the core networks 122 and 132 is responsible for performing mobility management, network-side authentication, and interfaces with public/external networks (e.g., the Internet).

The access networks 121 and 131 and the core networks 122 and 132 may each include one or more network nodes for carrying out said functions. For example, if the service network 120 is a GSM/GPRS/EDGE network, the access network 121 may be a GSM EDGE Radio Access Network (GERAN) which includes at least a Base Transceiver Station (BTS) and a Base Station Controller (BSC), and the core network 122 may be a GPRS core which includes at least a Mobile Switching Center (MSC), Home Location Register (HLR), Serving GPRS Support Node (SGSN), and Gateway GPRS Support Node (GGSN).

If the service network 120 is a WCDMA network, the access network 121 may be a Universal Terrestrial Radio Access Network (UTRAN) and the core network 122 may be a General Packet Radio Service (GPRS) core which includes a Home Location Register (HLR), at least one Serving GPRS Support Node (SGSN), and at least one Gateway GPRS Support Node (GGSN).

If the service network 120 or 130 is an LTE-based network, the access network 121 or 131 may be an Evolved-UTRAN (E-UTRAN) which includes at least an evolved NB (eNB) (e.g., a macro eNB, femto eNB, or pico eNB), and the core network 122 or 132 may be an Evolved Packet Core (EPC) which includes a Home Subscriber Server (HSS), Mobility Management Entity (MME), Serving Gateway (S-GW), Packet Data Network Gateway (PDN-GW or P-GW), and IP Multimedia Subsystem (IMS) server.

If the service network 120 is a 5G NR network, the access network 121 may be a Radio Access Network (RAN) 121 which includes at least a gNB or Transmission Reception Point (TRP), and the core network 122 may be a Next Generation Core Network (NG-CN) which includes various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

Figure 2:
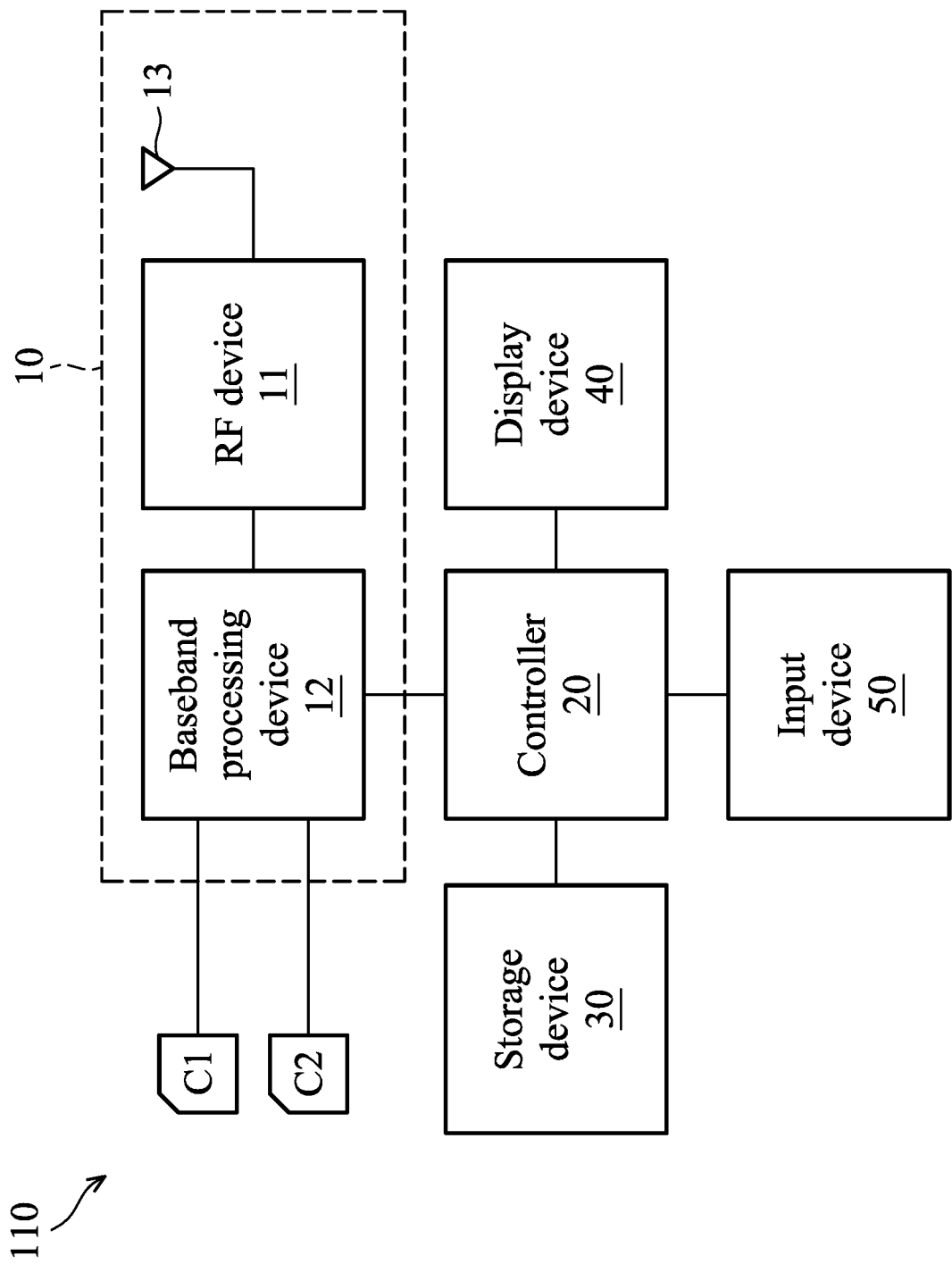
FIG. 2 is a block diagram illustrating the mobile communication device 110 according to an embodiment of the application.

FIG. 2 is a block diagram illustrating the mobile communication device 110 according to an embodiment of the application.

The mobile communication device 110 includes a wireless transceiver 10, a controller 20, a storage device 30, a display device 40, and an input device 50.

The wireless transceiver 10 is configured to perform communications with the service networks 120 and 130 using two subscriber identity cards (denoted as C1 and C2 in FIG. 2). Specifically, the wireless transceiver 10 includes an RF device 11, a baseband processing device 12, and an antenna 13. The baseband processing device 12 is configured to perform baseband signal processing and control the communications between the subscriber identity cards C1 and C2 and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

In one embodiment, a dual-card controller (not shown) may be coupled between the baseband processing device 12 and the subscriber identity cards C1 and C2 for powering the subscriber identity cards C1 and C2 with the same or different voltage levels according to the requirements thereof by a Power Management Integrated Chip (PMIC) and a battery, wherein the voltage level for each subscriber identity card is determined during initiation. The baseband processing device 12 may read data from one of the subscriber identity cards C1 and C2, and writes data to one of the subscriber identity cards C1 and C2 via the dual-card controller. In addition, the dual-card controller selectively transfers clocks, resets, and/or data signals to the subscriber identity cards C1 and C2 according to instructions issued by the baseband processing device 12.

In another embodiment, the baseband processing device 12 may include two interfaces (not shown) which independently handle the connections to the subscriber identity cards C1 and C2. It should be understood that the hardware architecture shown in FIG. 2 may be modified to include more than two subscriber identity cards, and the application should not be limited thereto.

The RF device 11 may receive RF wireless signals via the antenna 13, convert the received RF wireless signals to baseband signals, which are processed by the baseband processing device 12, or receive baseband signals from the baseband processing device 12 and convert the received baseband signals to RF wireless signals, which are later transmitted via the antenna 13. The RF device 11 may also contain multiple hardware devices to perform radio frequency conversion. For example, the RF device 11 may comprise a mixer to multiply the baseband signals with a carrier oscillated in the radio frequency of the supported wireless technologies, wherein the radio frequency may be 900 MHz, 1800 MHz or 1900 MHz utilized in GSM/EDGE/GPRS systems, or may be 900 MHz, 1900 MHz or 2100 MHz utilized in WCDMA systems, or may be 850 MHz, 1900 MHz, or 2100 MHz utilized in IS-95/CDMA-2000/CDMA-2000 1×EV-DO technology, or may be 900 MHz, 2100 MHz, or 2.6 GHz utilized in LTE/LTE-A/TD-LTE technology, or another radio frequency, depending on the wireless technology in use.

The controller 20 may be a general-purpose processor, a Micro Control Unit (MCU), an application processor, a Digital Signal Processor (DSP), or the like, which includes various circuitry for providing the function of data processing and computing, controlling the wireless transceiver 10 for coordinating the communication operations associated with the subscriber identity cards C1 and C2, storing and retrieving data to and from the storage device 30, sending a series of frame data (e.g. representing text messages, graphics, images, etc.) to the display device 40, and receiving signals from the input device 50.

In another embodiment, the controller 20 may be incorporated into the baseband processing device 12, serving as a baseband processor.

As will be appreciated by persons skilled in the art, the circuitry of the controller 20 will typically include transistors that are configured in such a way as to control the operation of the circuitry in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 is a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing instructions and/or program code of applications, communication protocols, and/or the method of the present application.

The display device 40 may be a Liquid-Crystal Display (LCD), Light-Emitting Diode (LED) display, Organic LED (OLED) display, or Electronic Paper Display (EPD), etc., for providing a display function. Alternatively, the display device 40 may further comprise one or more touch sensors disposed thereon or thereunder for sensing touches, contacts, or approximations of objects, such as fingers or styluses.

The input device 50 may comprise one or more buttons, a keyboard, a mouse, a touch pad, a video camera, a microphone, and/or a speaker, etc., serving as the Man-Machine Interface (MIMI) for interaction with users.

It should be understood that the components described in the embodiment of FIG. 2 are for illustrative purposes only and are not intended to limit the scope of the application. For example, the mobile communication device 110 may further include a WiFi device for providing the function of WiFi communications, a Global Positioning System (GPS) device for use of some location-based services or applications, and/or a power, etc. Alternatively, the mobile communication device 110 may include less components. For example, the mobile communication device 110 may not include the display device 40 and/or the input device 50.

Figure 3:
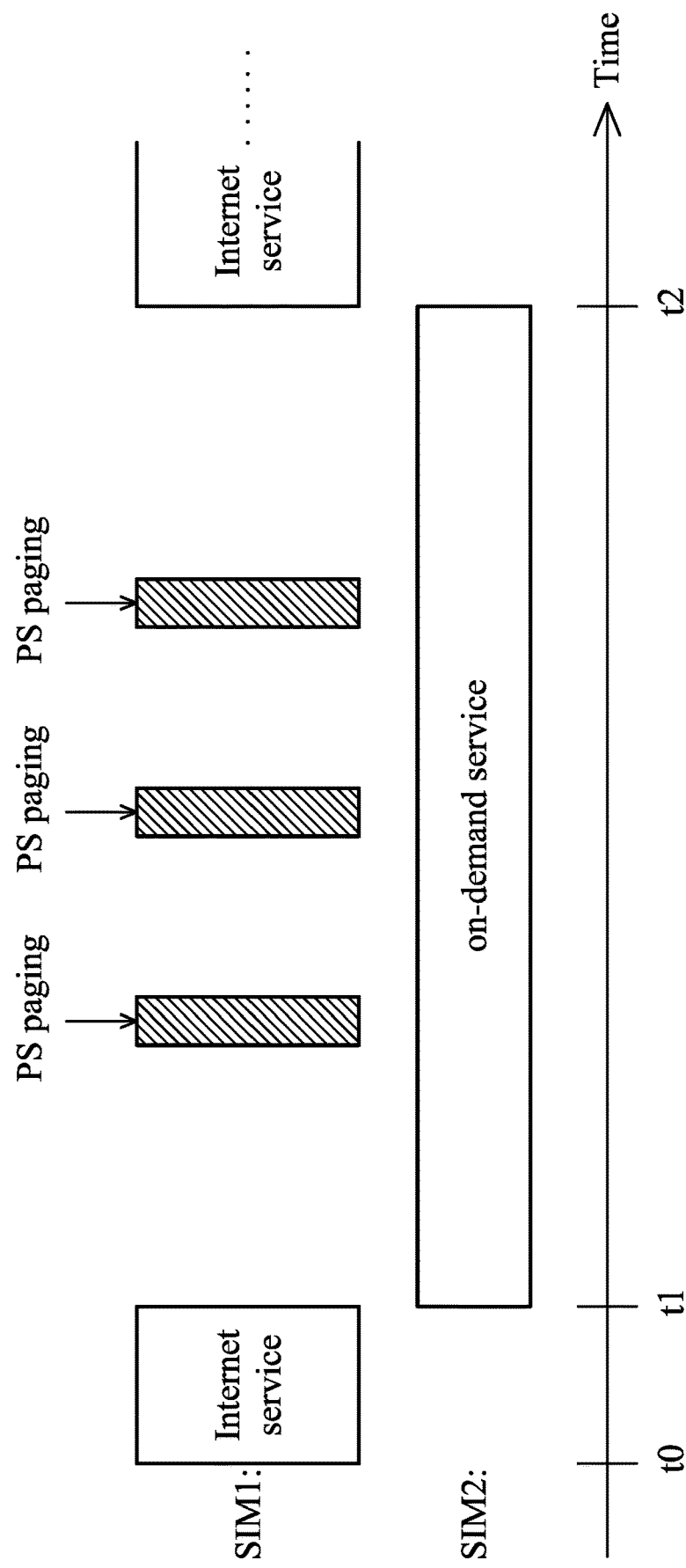
FIG. 3 is a block diagram illustrating the coordination of communication operations associated with two subscriber identities in a mobile communication device comprising an RF device according to an embodiment of the application.

FIG. 3 is a block diagram illustrating the coordination of communication operations associated with two subscriber identities in a mobile communication device comprising an RF device according to an embodiment of the application.

In this embodiment, the first subscriber identity (denoted as SIM1) is used to communicate with a PS-based network in which the IMS service is unavailable, while the second subscriber identity (denoted as SIM2) is used to communicate with a legacy network (e.g., a WCDMA network). Since the IMS service is unavailable with the first subscriber identity in the PS-based network, the PS paging messages from the PS-based network will not be call-related. Specifically, the IMS service being unavailable with the first subscriber identity in the PS-based network means that the mobile communication device is not IMS-registered with SIM1 to the PS-based network, wherein the IMS-registered state indicates that an IMS connection has been established and Session Initiation Protocol (SIP) registration via the IMS connection has completed.

As shown in FIG. 3, at time t0, the RF device is allocated for obtaining the Internet service (e.g., e-mail service, web page browsing, or file transmission, etc.) from the PS-based network using SIM1. Later, at time t1, in response to starting an on-demand service (e.g., MMS, or video streaming service, etc.) associated with SIM2, the RF device is allocated for the on-demand service associated with SIM2 due to that the on-demand service has a higher priority than the Internet service.

It should be noted that, during the ongoing on-demand service, the PS paging messages associated with SIM1 are ignored because the IMS service is unavailable with SIM1 in the PS-based network (i.e., the PS paging messages are not for call-related services).

Specifically, by ignoring the PS paging messages, it means that the RF device is temporarily allocated for receiving the PS paging messages associated with SIM1, but then the RF device is switched right back to be used for the on-demand service associated with SIM2. That is, in response to ignoring the PS paging messages, the communication operations (including connection establishment, and data transfer) responding to the PS paging messages are not performed, so that the RF device will not be occupied by the communication operations associated with SIM1 for too long and the interruption time of the ongoing on-demand service may be significantly reduced.

After that, when the on-demand service associated with SIM2 is finished at time t2, the RF device is allocated for resuming the Internet service associated with SIM1.

Figure 4:
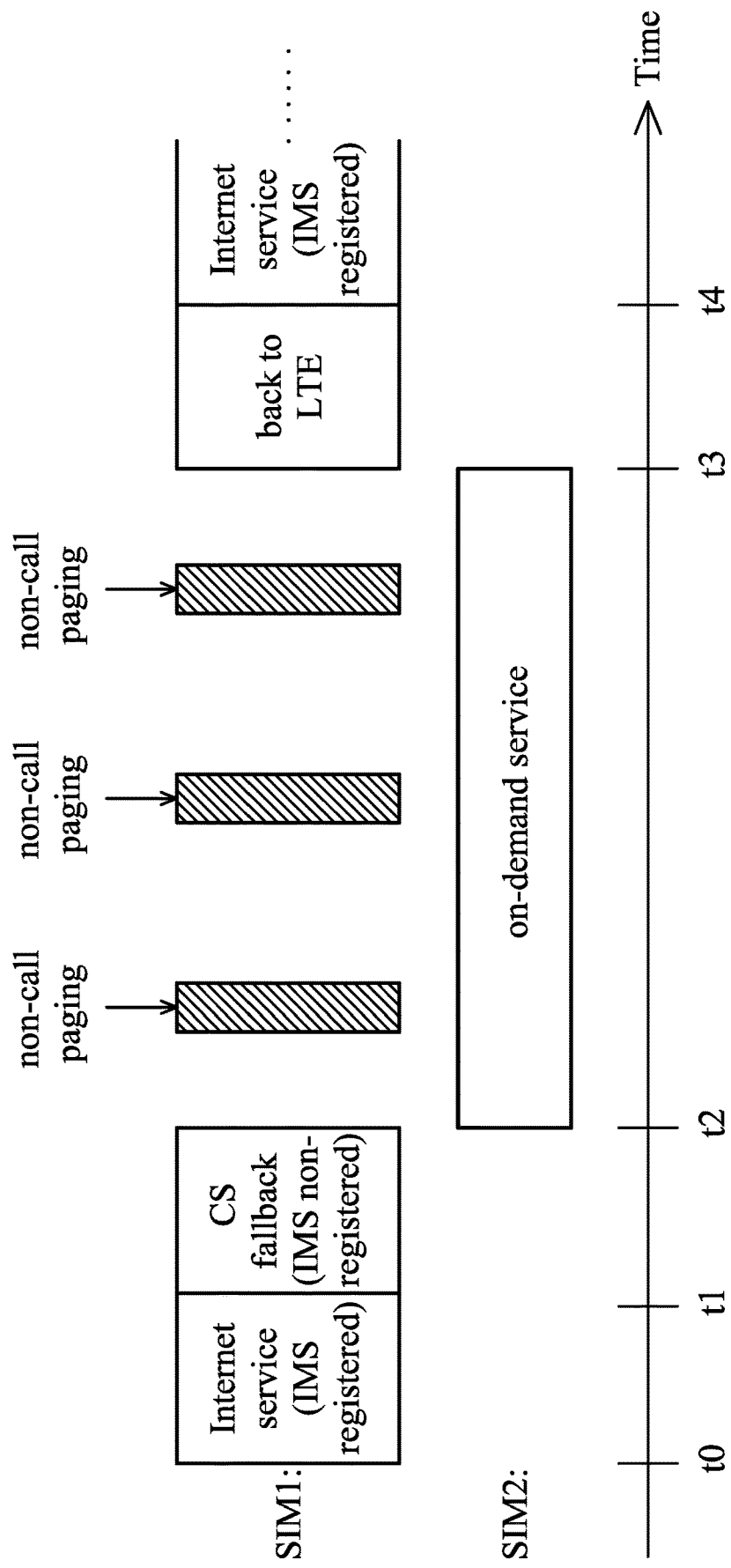
FIG. 4 is a block diagram illustrating the coordination of communication operations associated with two subscriber identities in a mobile communication device comprising an RF device according to another embodiment of the application.

FIG. 4 is a block diagram illustrating the coordination of communication operations associated with two subscriber identities in a mobile communication device comprising an RF device according to another embodiment of the application.

In this embodiment, the first subscriber identity (denoted as SIM1) is used to communicate with a PS-based network in which the IMS service is available or with a CS legacy network (e.g., a GSM network or the CS domain of an EDGE/GPRS/WCDMA network), while the second subscriber identity (denoted as SIM2) is used to communicate with another service network (e.g., a WCDMA network). Specifically, the IMS service being available with the first subscriber identity in the PS-based network means that the mobile communication device is IMS-registered with SIM1 to the PS-based network, wherein the IMS-registered state indicates that an IMS connection has been established and SIP registration via the IMS connection has completed.

As shown in FIG. 4, at time to, the RF device is allocated for obtaining the Internet service from the PS-based network using SIM1. Later, at time t1, in response to starting an on-demand service (which has a higher priority than the Internet service) associated with SIM2, the RF device is allocated for using SIM1 to switch from the PS-based network to the CS legacy network, and the mobile communication device is IMS-non-registered with SIM1 to the CS legacy network.

Subsequently, when the network switching procedure (also called a CS Fall Back (CSFB) procedure) associated with SIM1 is finished at time t2, the RF device is allocated for the on-demand service associated with SIM2.

It should be noted that, during the ongoing on-demand service, the non-call paging messages associated with SIM1 are ignored. Specifically, by ignoring the non-call paging messages, it means that the RF device is only temporarily allocated for receiving the non-call paging messages associated with SIM1, but then the RF device is switched right back to be used for the on-demand service associated with SIM2. That is, in response to ignoring the non-call paging messages, the communication operations (including connection establishment and data transfer) responding to the non-call paging messages are not performed, so that the RF device will not be occupied by the communication operations associated with SIM1 for too long and the interruption time of the ongoing on-demand service may be significantly reduced.

After that, when the on-demand service associated with SIM2 is finished at time t3, the RF device is allocated for switching back to the PS-based network using SIM1. Subsequently, when the network switch procedure associated with SIM1 is finished at time t4, the RF device is allocated for resuming the Internet service associated with SIM1 and returning to the IMS-registered state.

Figure 5:
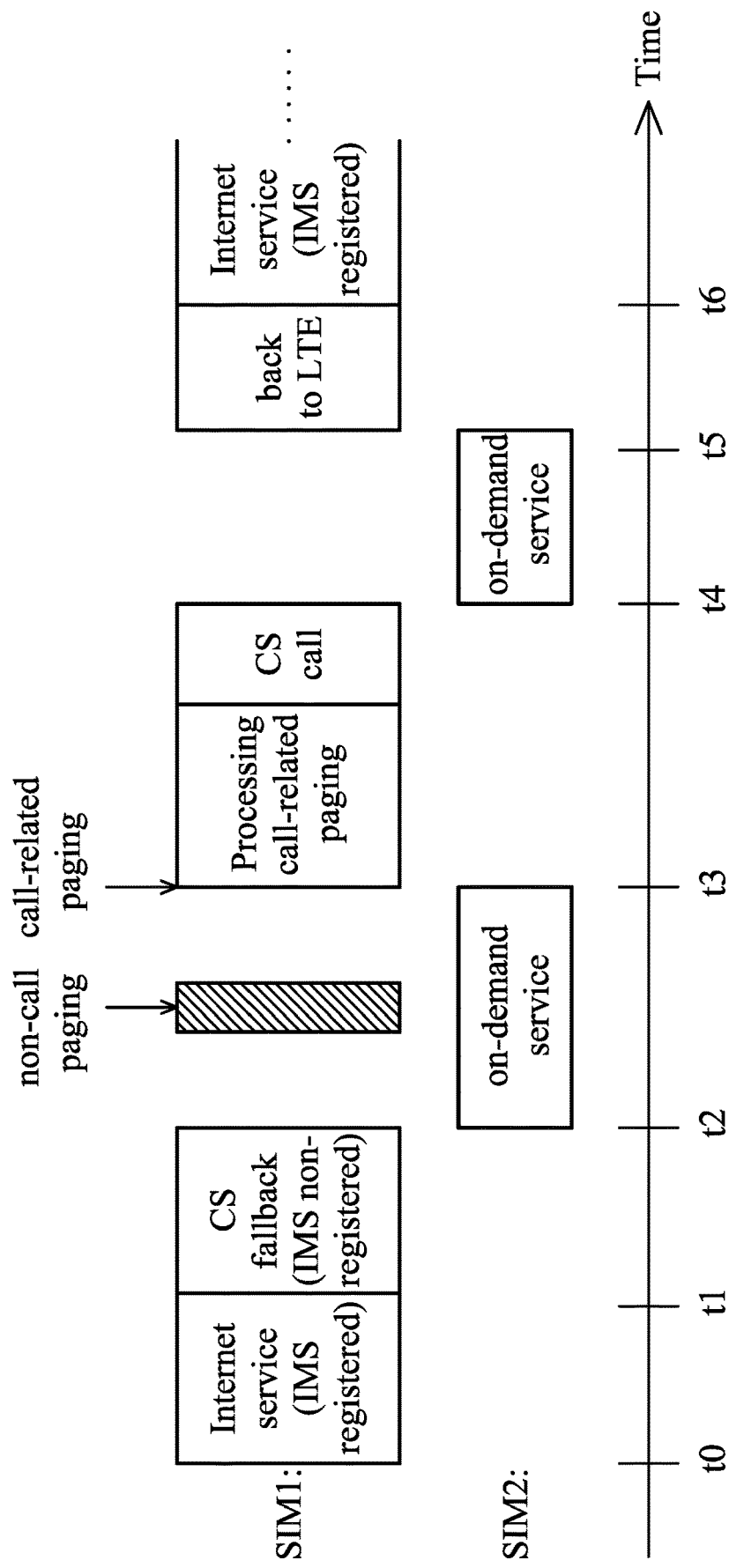
FIG. 5 is a block diagram illustrating the coordination of communication operations associated with two subscriber identities in a mobile communication device comprising an RF device according to another embodiment of the application.

FIG. 5 is a block diagram illustrating the coordination of communication operations associated with two subscriber identities in a mobile communication device comprising an RF device according to another embodiment of the application.

In this embodiment, the first subscriber identity (denoted as SIM1) is used to communicate with a PS-based network in which the IMS service is available or with a CS legacy network (e.g., a GSM network or the CS domain of an EDGE/GPRS/WCDMA network), while the second subscriber identity (denoted as SIM2) is used to communicate with another service network (e.g., a WCDMA network). Specifically, the IMS service being available with the first subscriber identity in the PS-based network means that the mobile communication device is IMS-registered with SIM1 to the PS-based network, wherein the IMS-registered state indicates that an IMS connection has been established and SIP registration via the IMS connection has completed.

As shown in FIG. 5, at time t0, the RF device is allocated for obtaining the Internet service from the PS-based network using SIM1. Later, at time t1, in response to starting an on-demand service (which has a higher priority than the Internet service) associated with SIM2, the RF device is allocated for using SIM1 to switch from the PS-based network to the CS legacy network, and the mobile communication device is IMS-non-registered with SIM1 to the CS legacy network.

Subsequently, when the network switch procedure (also called a CSFB procedure) associated with SIM1 is finished at time t2, the RF device is allocated for the on-demand service associated with SIM2.

It should be noted that, during the ongoing on-demand service, the non-call paging message associated with SIM1 is ignored, while the call-related paging message associated with SIM1 is processed. Specifically, by processing the call-related paging message received at time t3, it means that the RF device is allocated for receiving the call-related paging message and performing the responding communication operations and making a CS call.

After that, when the CS call service associated with SIM1 is finished at time t4, the RF device is allocated for resuming the on-demand service associated with SIM2. Subsequently, when the on-demand service associated with SIM2 is finished at time t5, the RF device is allocated for switching back to the PS-based network using SIM1. When the network switching procedure associated with SIM1 is finished at time t6, the RF device is allocated for resuming the Internet service associated with SIM1 and returning to the IMS-registered state.

Figure 6:
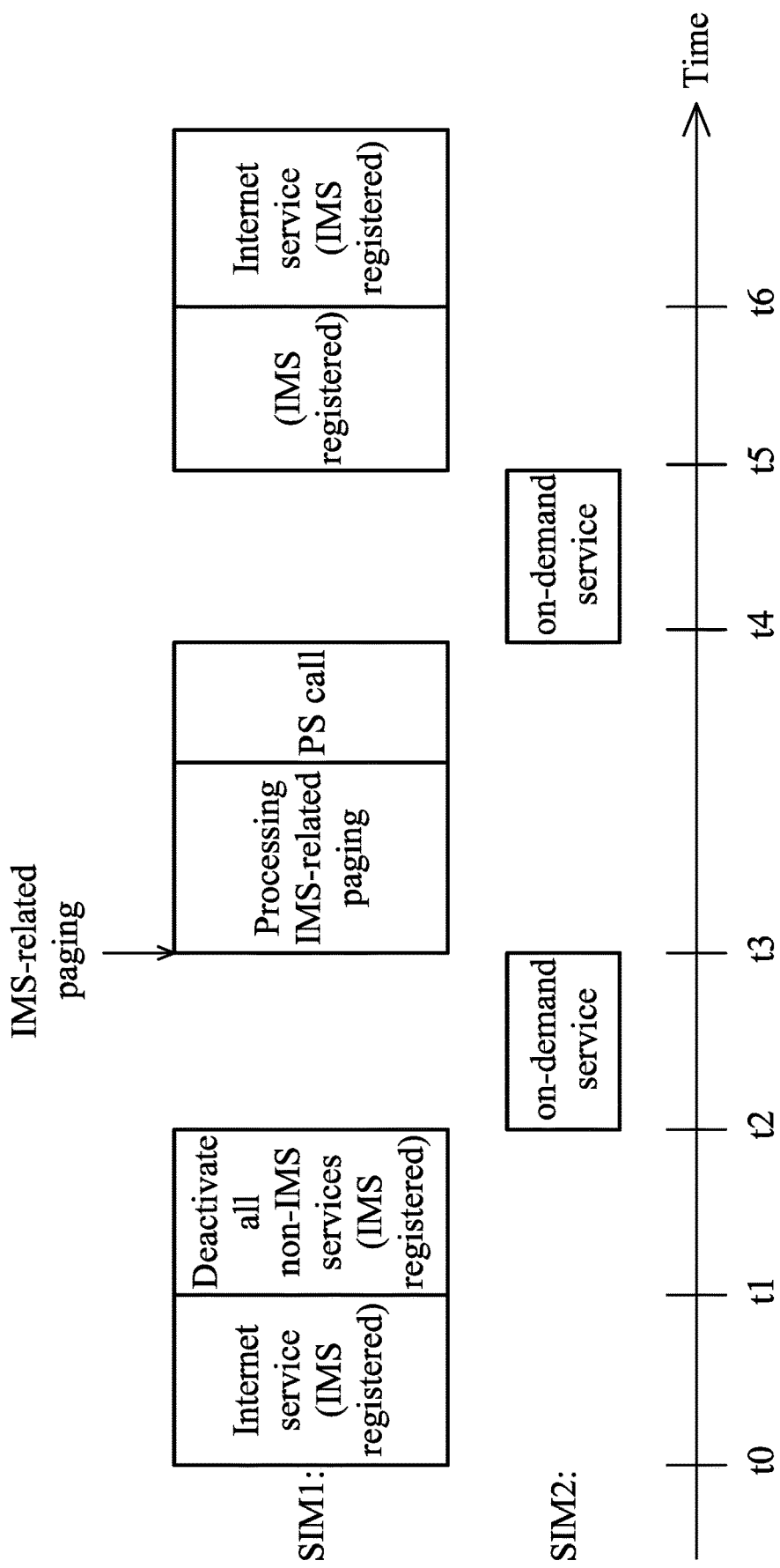
FIG. 6 is a block diagram illustrating the coordination of communication operations associated with two subscriber identities in a mobile communication device comprising an RF device according to another embodiment of the application.

FIG. 6 is a block diagram illustrating the coordination of communication operations associated with two subscriber identities in a mobile communication device comprising an RF device according to another embodiment of the application.

In this embodiment, the first subscriber identity (denoted as SIM1) is used to communicate with a PS-based network in which the IMS service is available, while the second subscriber identity (denoted as SIM2) is used to communicate with another service network (e.g., a WCDMA network). Specifically, the IMS service being available with the first subscriber identity in the PS-based network means that the mobile communication device is IMS-registered with SIM1 to the PS-based network, wherein the IMS-registered state indicates that an IMS connection has been established and SIP registration via the IMS connection has completed.

As shown in FIG. 6, at time t0, the RF device is allocated for obtaining the Internet service from the PS-based network using SIM1. Later, at time t1, in response to starting an on-demand service (which has a higher priority than the Internet service) associated with SIM2, the mobile communication device deactivates all non-IMS services (i.e., the Internet service). When all non-IMS services are deactivated at time t2, the RF device is allocated for the on-demand service associated with SIM2.

It should be noted that, since all non-IMS services associated with SIM1 have been deactivated, the upcoming paging messages associated with SIM1 will be IMS-related paging messages only. That is, the mobile communication device may avoid receiving non-IMS paging messages associated with SIM1.

Subsequently, during the ongoing on-demand service, an IMS-related paging message associated with SIM1 is received and processed at time t3. Specifically, by processing the IMS-related paging message, it means that the RF device is allocated for receiving the IMS-related paging message and performing the responding communication operations and receiving a PS call when the IMS related-paging message is for a PS MT call.

After that, when the PS call service associated with SIM1 is finished at time t4, the RF device is allocated for resuming the on-demand service associated with SIM2. Subsequently, when the on-demand service associated with SIM2 is finished at time t5, the RF device is allocated to SIM1 for returning to the IMS-registered state. Next, at time t6, the RF device is allocated for resuming the Internet service associated with SIM1.

Figure 7:
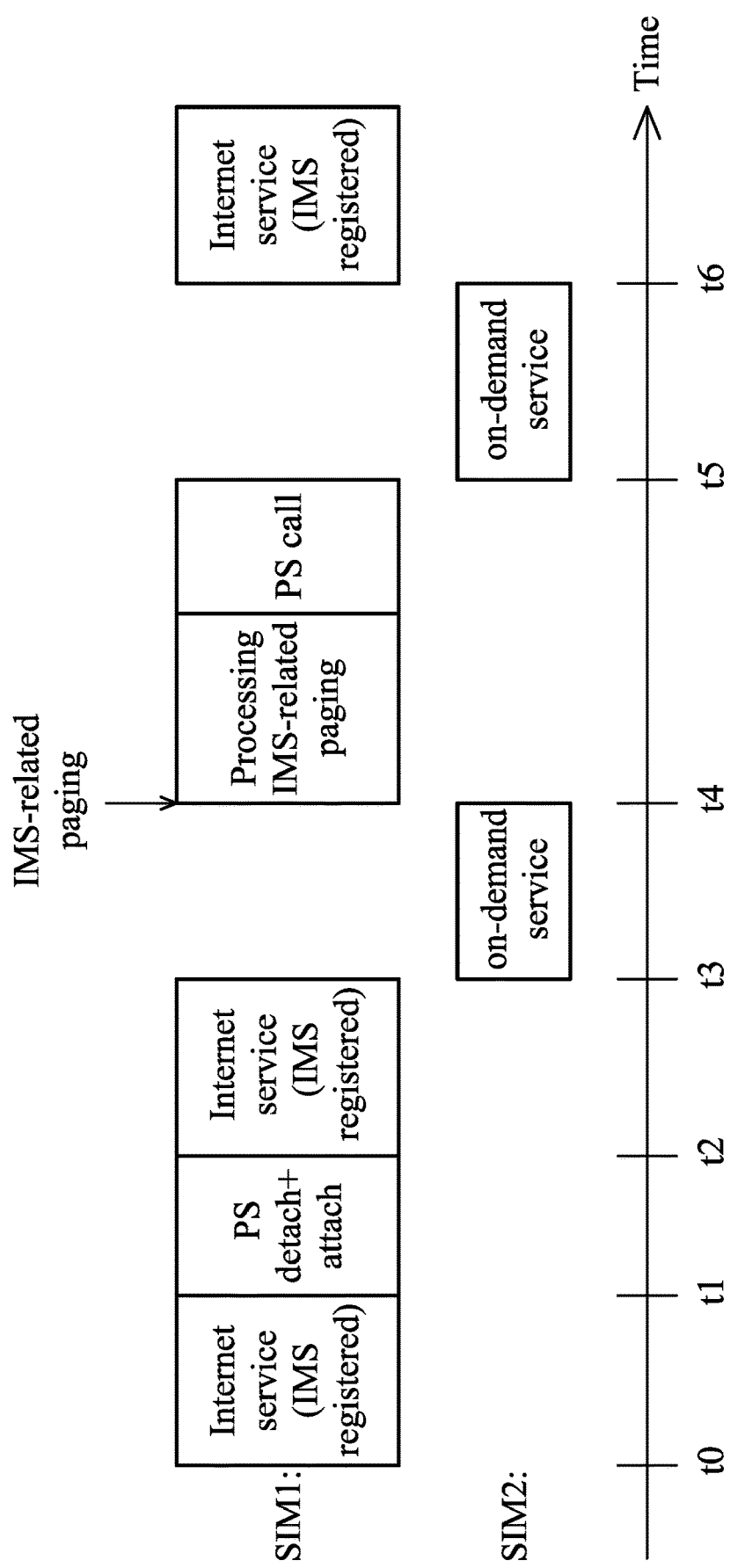
FIG. 7 is a block diagram illustrating the coordination of communication operations associated with two subscriber identities in a mobile communication device comprising an RF device according to another embodiment of the application.

FIG. 7 is a block diagram illustrating the coordination of communication operations associated with two subscriber identities in a mobile communication device comprising an RF device according to another embodiment of the application.

In this embodiment, the first subscriber identity (denoted as SIM1) is used to communicate with a PS-based network in which the IMS service is available, while the second subscriber identity (denoted as SIM2) is used to communicate with another service network (e.g., a WCDMA network). Specifically, the IMS service being available with the first subscriber identity in the PS-based network means that the mobile communication device is IMS-registered with SIM1 to the PS-based network, wherein the IMS-registered state indicates that an IMS connection has been established and SIP registration via the IMS connection has completed.

As shown in FIG. 7, at time t0, the RF device is allocated for obtaining the Internet service from the PS-based network using SIM1. Later, at time t1, in response to starting an on-demand service (which has a higher priority than the Internet service) associated with SIM2, the RF device is allocated for performing a PS detach procedure and a PS attach procedure with the PS-based network using SIM1. When the PS detach and attach procedures are finished at time t2, the RF device is allocated for restarting the Internet service associated with SIM1 (which was ongoing before the PS detach and attach procedures) and return to the IMS-registered state.

It should be noted that, due to the PS detach and attach procedures and that the Internet service is restarted, garbage traffic corresponding to the Internet service (e.g., non-IMS paging messages) may be avoided.

Subsequently, when the Internet service has been restarted and SIM1 has returned to the IMS-registered state at time t3, the RF device is allocated for the on-demand service associated with SIM2.

During the ongoing on-demand service, an IMS-related paging message associated with SIM1 is received and processed at time t4. Specifically, by processing the IMS-related paging message, it means that the RF device is allocated for receiving the IMS-related paging message and performing the responding communication operations and receiving a PS call when the IMS related-paging message is for a PS MT call.

After that, when the PS call service associated with SIM1 is finished at time t5, the RF device is allocated for resuming the on-demand service associated with SIM2. Subsequently, when the on-demand service associated with SIM2 is finished at time t6, the RF device is allocated for resuming the Internet service associated with SIM1 and returning to the IMS-registered state.

In view of the forgoing embodiments, it will be appreciated that the present application improves the coordination of communication operations associated with multiple subscriber identities sharing an RF device, by ignoring or avoiding receiving low-priority paging messages associated with one subscriber identity when another subscriber identity is used for an ongoing high-priority service. Advantageously, the interruption time of the ongoing high-priority service may be significantly reduced.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A mobile communication device, comprising:
   a Radio Frequency (RF) device; and
   a controller, coupled to the RF device and configured to:
      allocate the RF device to selectively communicate with a Packet Switched (PS)-based network using a first subscriber identity or with a service network using a second subscriber identity, wherein the PS-based network is a 4G, 5G, or more advanced cellular network,
   and in response to initiating an on-demand service associated with the second subscriber identity, the controller further performs either one of the following:
      when an IP Multimedia Subsystem (IMS) service is unavailable with the first subscriber identity in the PS-based network, preventing the mobile communication device from using the first subscriber identity to perform any communication operation responding to a PS paging message associated with the first subscriber identity from the PS-based network during the ongoing on-demand service; and
      switching from the PS-based network to a Circuit-Switched (CS) legacy network using the first subscriber identity when the IMS service is available with the first subscriber identity in the PS-based network, and ignoring a non-call paging message from the CS legacy network during the ongoing on-demand service.

2. The mobile communication device of claim 1, wherein the on-demand service is a Multimedia Messaging Service (MMS), or a video streaming service.

3. The mobile communication device of claim 1, wherein the paging message is a Packet-Switched (PS) paging message received from the PS-based network, and the paging message is ignored in response to an IP Multimedia Subsystem (IMS) service being unavailable with the first subscriber identity in the PS-based network.

4. The mobile communication device of claim 1, wherein, prior to ignoring the paging message associated with the first subscriber identity, the controller is further configured to switch from the PS-based network to a Circuit-Switched (CS) legacy network using the first subscriber identity in response to an IMS service being available with the first subscriber identity in the PS-based network, and the paging message is a non-call paging message received from the CS legacy network.

5. The mobile communication device of claim 4, wherein the controller is further configured to suspend the on-demand service associated with the second subscriber identity and make a CS call using the first subscriber identity, in response to receiving a call-related paging message from the CS legacy network.

6. A method for coordinating communication operations associated with a plurality of subscriber identities in a mobile communication device comprising an RF device, the method comprising:
   allocating the RF device to selectively communicate with a PS-based network using a first subscriber identity or with a service network using a second subscriber identity, wherein the PS-based network is a 4G, 5G, or more advanced cellular network; and
   in response to initiating an on-demand service associated with the second subscriber identity, performing either one of the following:
   when an IP Multimedia Subsystem (IMS) service is unavailable with the first subscriber identity in the PS-based network, preventing the mobile communication device from using the first subscriber identity to perform any communication operation responding to a PS paging message associated with the first subscriber identity from the PS-based network during the ongoing on-demand service; and
   switching from the PS-based network to a Circuit-Switched (CS) legacy network using the first subscriber identity when the IMS service is available with the first subscriber identity in the PS-based network, and only processing a call paging message from the CS legacy network during the ongoing on-demand service.

7. The method of claim 6, wherein the on-demand service is an MMS or a video streaming service.

8. The method of claim 6, wherein the paging message is a PS paging message received from the PS-based network, and the paging message is ignored in response to an IMS service being unavailable with the first subscriber identity in the PS-based network.

9. The method of claim 6, further comprising:
   prior to ignoring the paging message associated with the first subscriber identity, switching from the PS-based network to a CS legacy network using the first subscriber identity in response to an IMS service being available with the first subscriber identity from the PS-based network,
   wherein the paging message is a non-call paging message received from the CS legacy network.

10. The method of claim 9, further comprising:
    suspending the on-demand service associated with the second subscriber identity and making a CS call using the first subscriber identity, in response to receiving a call-related paging message from the CS legacy network.

\* \* \* \* \*